United States Patent [19]

Gatch

[11] 4,452,271
[45] Jun. 5, 1984

[54] PLASTIC PIPE SQUEEZING DEVICE AND VALVE BOX FOR USE THEREWITH

[75] Inventor: Harry Gatch, Summerville, S.C.

[73] Assignee: Handley Industries, Inc., Jackson, Mich.

[21] Appl. No.: 301,708

[22] Filed: Sep. 14, 1981

[51] Int. Cl.³ .............................................. F16L 5/00
[52] U.S. Cl. ...................................... 137/369; 251/7; 72/407
[58] Field of Search ....................... 137/368, 369, 370; 251/7, 8, 9, 6; 24/249 R, 254; 72/407, 450, 458, 387; 294/19 R, 11

[56] References Cited

U.S. PATENT DOCUMENTS

| | | | |
|---|---|---|---|
| 3,102,710 | 9/1963 | Dresden | 251/9 |
| 3,589,668 | 6/1971 | Gill | 251/8 |
| 3,601,143 | 8/1971 | Glennon | 137/364 |
| 3,733,046 | 5/1973 | Press | 251/8 |
| 3,746,034 | 7/1973 | Cosson | 137/364 |
| 3,774,876 | 11/1973 | Melsheimer | 251/8 |
| 3,791,617 | 2/1974 | Press | 251/8 |
| 3,811,649 | 5/1974 | Press et al. | 251/8 |
| 3,901,271 | 8/1975 | Stewart | 137/364 |
| 4,257,446 | 3/1981 | Ray | 251/8 |
| 4,308,886 | 1/1982 | Handley et al. | 137/370 |
| 4,325,375 | 4/1982 | Nevyas | 294/19 R |

OTHER PUBLICATIONS

*Socket and Saddle Fusion Tools for Plastic Pipe*, Plastic Pipe Tools and Equipment, Jan. 1977.

*Aldyl "A" New Products*, Dupont.
*Aldyl "A" Installation*, Dupont.
*Plastics in Gas Distribution*, Dupont.

*Primary Examiner*—Martin P. Schwadron
*Assistant Examiner*—Sheri Novack
*Attorney, Agent, or Firm*—Jim Zegeer

[57] ABSTRACT

An extended vertical and parallel squeezing device for plastic pipe in a plastic pipe distribution system for fluent materials such as gas and water. According to the invention, height adjustable valve boxes are provided at predetermined squeeze-off points. The plastic pipe squeeze device comprises a pair of squeeze bars which are rotated about a common axis from above the ground via the valve box. A hollow circular shaft and a second shaft internally therein have pipe engaging members at the lower ends thereof, respectively, and a drive means is provided at the opposite ends of the vertical shaft for relatively rotating same so that the pipe engaging members rotate towards each other to squeeze the plastic pipe therebetween. Stop means are provided to limit the amount of squeeze and avoid damage to the plastic pipe and a spacer, offset from the point of engagement of the pipe engaging members provide space for distortion of the pipe from round to oval as it is squeezed. Cranks at the top and bottom coupled to oppositely rotated screws and a rachet mechanism provide the drive for rotating the inner and outer pipe in opposite relative rotational directions.

10 Claims, 4 Drawing Figures

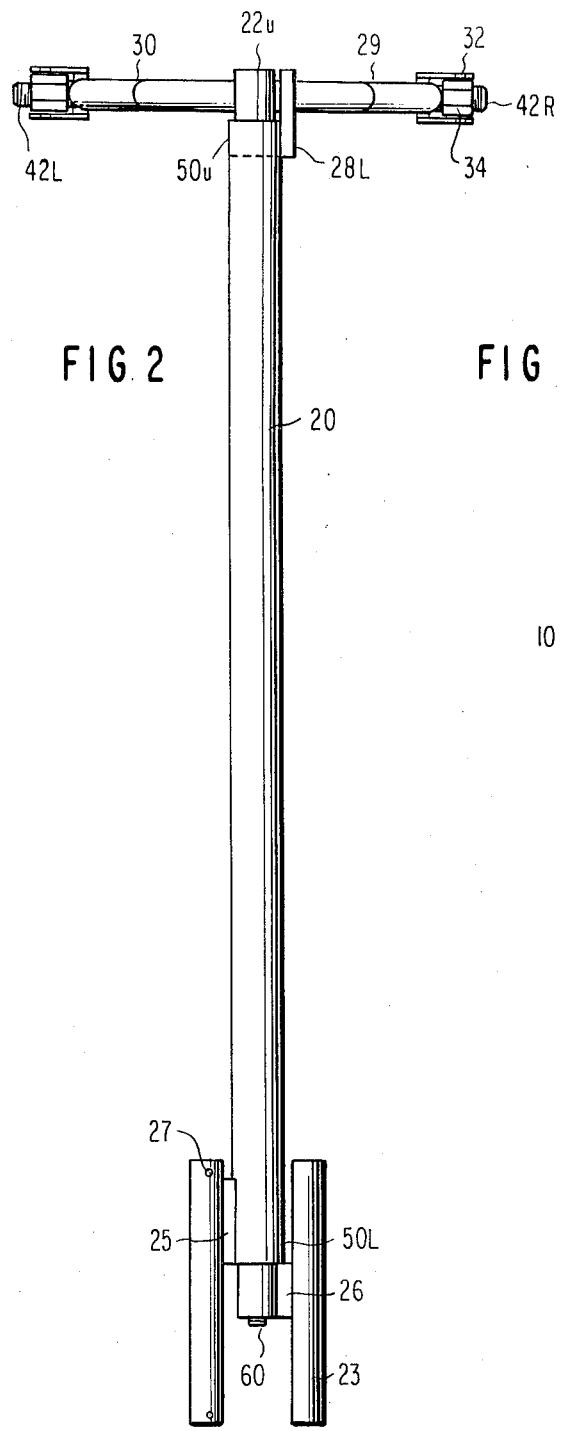
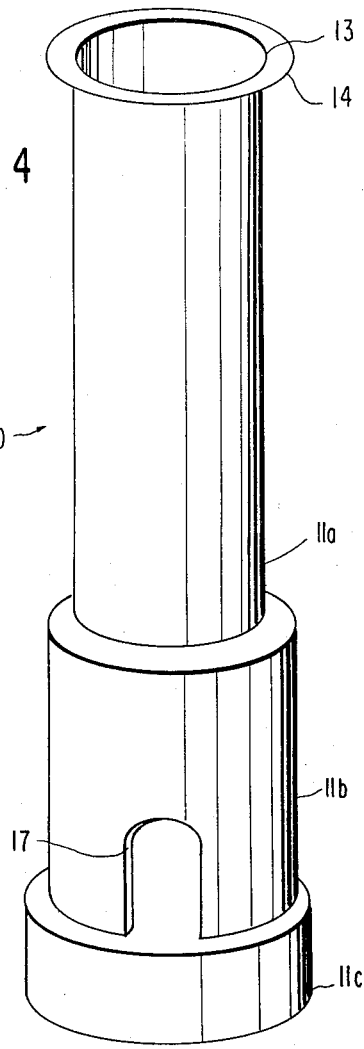
FIG. 2
FIG. 4

PLASTIC PIPE SQUEEZING DEVICE AND VALVE BOX FOR USE THEREWITH

BRIEF BACKGROUND DESCRIPTION OF THE INVENTION AND THE PRIOR ART

There is need to reduce time and liability while improving efficiency in eliminating leaks in fluent material distribution systems, particularly, termination of a blowing gas leak in gas distribution systems. At the present time, approximately four hours is involved in rendering a gas main safe. A broken underground main currently requires on site men and equipment to dig separate holes on both sides of the break to the main. After the broken section of the pipe has been located, separate holes on both sides of the break are dug and the squeezing machines are applied at the two points dug and then the leaking section of pipe is repaired either by replacement with a new section and/or other type of repair.

In the prior art, U.S. Pat. No. 4,257,466 discloses a system incorporating the use of valve boxes which can receive a pipe squeeze apparatus. However, in this patent, the squeeze apparatus required that the valve box be large enough to accomodate the fitting of a component underneath the plastic pipe very much in the way of conventional plastic pipe squeeze devices. In this prior art device, the valve box is designed to permit the squeeze apparatus to slide to one side of the pipe and then is guided there by means of the bottom or camming of the device. According to the present invention a relatively narrow cylindrical valve box arrangement is provided in which the valve box has telescoping portions to adjust for different heights between surface elevations of the pipe and the ground level. According to the invention, a broken gas main, for example, can be rendered safe in a very short period of time (within seconds) without the use of a backhoe and/or pavement breakers. The judicious location of the valve boxes according to the invention permits isolating certain sections of the line between squeeze points without affecting service to the majority of the customer's on the line. Since gas companies are governed by the Department of Transportation (they transport gas over state lines between various points by the use of pipe line, they are subject to Department of Transportation (DOT)) regulations and these regulations require that any plastic main inside of a vault (which is any opening from ground surface to the main that is larger than 8 inches) must be shielded with steel pipe. Hence, the term "valve box" is intended to refer to any opening (cylindrical, rectangular, hexagonal etc.) in section from the ground surface to the main that is 8 inches or smaller and which does not thereby require steel shielding which would prevent squeezing of the plastic pipe. Thus, instead of using conventional valves and valve boxes, all that is present in the valve box is the passing portion of the plastic pipe. Thus, instead of a valve in a valve box or vault, (which requires periodic maintenance and record keeping in addition to turning-off of the valve to insure its operability) applicant's invention permits liberal placement of the squeeze-off points where they avoid the expense of a valve which requires much specialized equipment and work (i.e. plastic fusing equipment, specially trained personnel, costly valves and extensive backfilling and paving).

The squeeze device according to the present invention reaches into a valve box with a 6 inch inside diameter and approximately four feet (but which can vary and any such variation can be easily accomodated by the telescoping valve box of this invention) of depth in order to squeeze-off a plastic main which is up to 2⅜ inch in outside diameter exerting a minimum pressure of 800 pounds per square inch. The squeeze machine of this invention is activated with a rachet that drives a left and right hand threaded bar at the upper end of the machine above the ground level which, in turn, operates two levers in opposite rotational directions. This opposite rotary action is transmitted by a 1½ inch pipe rotating inside of a 2 inch pipe which is journaled for supporting the smaller pipe for rotation. Thus, the two pipes are rotated about a common axis and this transmits the squeezing force to squeeze bars which are secured to the lower ends of the two pipes and at a same radial distance from the axis of rotation. This permits the maximum spacing between the device to be not much greater than the 2⅜ inch outside diameter of the pipe to be squeezed-off plus the dimensions of twice the radius that the squeeze bars are radially spaced from the axis of rotation. The squeeze bars must remain parallel to each other while exerting pressure on the pipe and, the spacing of the squeeze bars (their closest distance together) must be closely controlled in order to prevent damage by over squeezing of the pipe. Hence, a stop member is provided to limit the minimum distance between the squeeze bars. As the pipe is squeezed it becomes tall and thin in a vertically oriented direction. According to the invention, a spacer is offset from the squeezing bars and this spacer positions and rests the device on the plastic main away from the squeeze point to allow the plastic to spread as it is squeezed preventing the squeeze portion of the pipe from hitting the top of the device. Moreover, the extended vertical and parallel squeezing device permits a reduction in expense and improves reliability because it is relatively maintenance free, does not require special records and/or special installation or personnel.

There is no interruption of gas flow during valve box installation (the lower edge of the valve box has a pair of aligned slots which fit over the plastic pipe) and there is no costly valve. Finally, and most important, the ability to use any point of the plastic pipe in conjunction with a valve box as a potential valve in emergencies is an important adjunct of the invention.

While I have referred to valve box and squeeze device in Ray U.S. Pat. No. 4,257,446 as part of the prior art, reference is also made to the squeeze pipe shut-off valves manufactured by the DuPont Company, squeeze type assemblies as manufactured by the PNS Engineering Division the Rigid Tool Company subsidiary of Emerson Electric Company, Gill U.S. Pat. No. 3,589,668 and Dresden U.S. Pat. No. 3,102,710, Press U.S. Pat. No. 3,733,046, Rink U.S. Pat. No. 3,770,023, Melsheimer U.S. Pat. No. 3,774,876, Press U.S. Pat. No. 3,791,617 and Press U.S. Pat. No. 3,811,649.

BRIEF DESCRIPTION OF THE DRAWINGS

The above and other objects, advantages and features of the invention will become more apparent when considered with the following specification and the accompanying drawings wherein:

FIG. 2 is a side elevational view partially cut away of the extended vertical and parallel plastic pipe squeezing device incorporating the present invention.

As shown in FIG. 1, a gas distribution pipe is constituted by a plastic pipe 10 which for purposes of illustration is a two inch plastic main made of DuPont Aldyl "a" (a registered trakemark of the DuPont Company) which is buried four to six feet beneath the ground and in this size range, the two inch plastic main is typically for distribution in residential areas. At specified locations throughout the distribution system, a valve box as described herein is provided, the valve box 11 is constructed in two telescoping parts 11a and 11b to adjust for different elevations of ground level. In FIG. 1, only two valve boxes 11 are shown, the plastic main 10 between the two valve boxes requiring repair and/or other maintenance. As illustrated, the lower valve box portion 11b has internal diameter 12 which is larger than the external diameter of the upper valve box portion 11a so that the portion 11a telescopes within the portion 11b. However, it will be appreciated that the upper portion 11a can have the larger diameter so that its internal diameter 13 is larger than the external diameter 15 of the lower valve box section 11b. As shown in FIG. 4, an annular rim 11c can be used to space the distribution main 10 from the bottom of the valve box. The upper valve box portion 11a has an annular rim 14 for receiving a cap (not shown) for sealing the opening and marking the location of the valve box and the cover may be fastened by bolts, locks or other securement (not shown).

Figure 1:
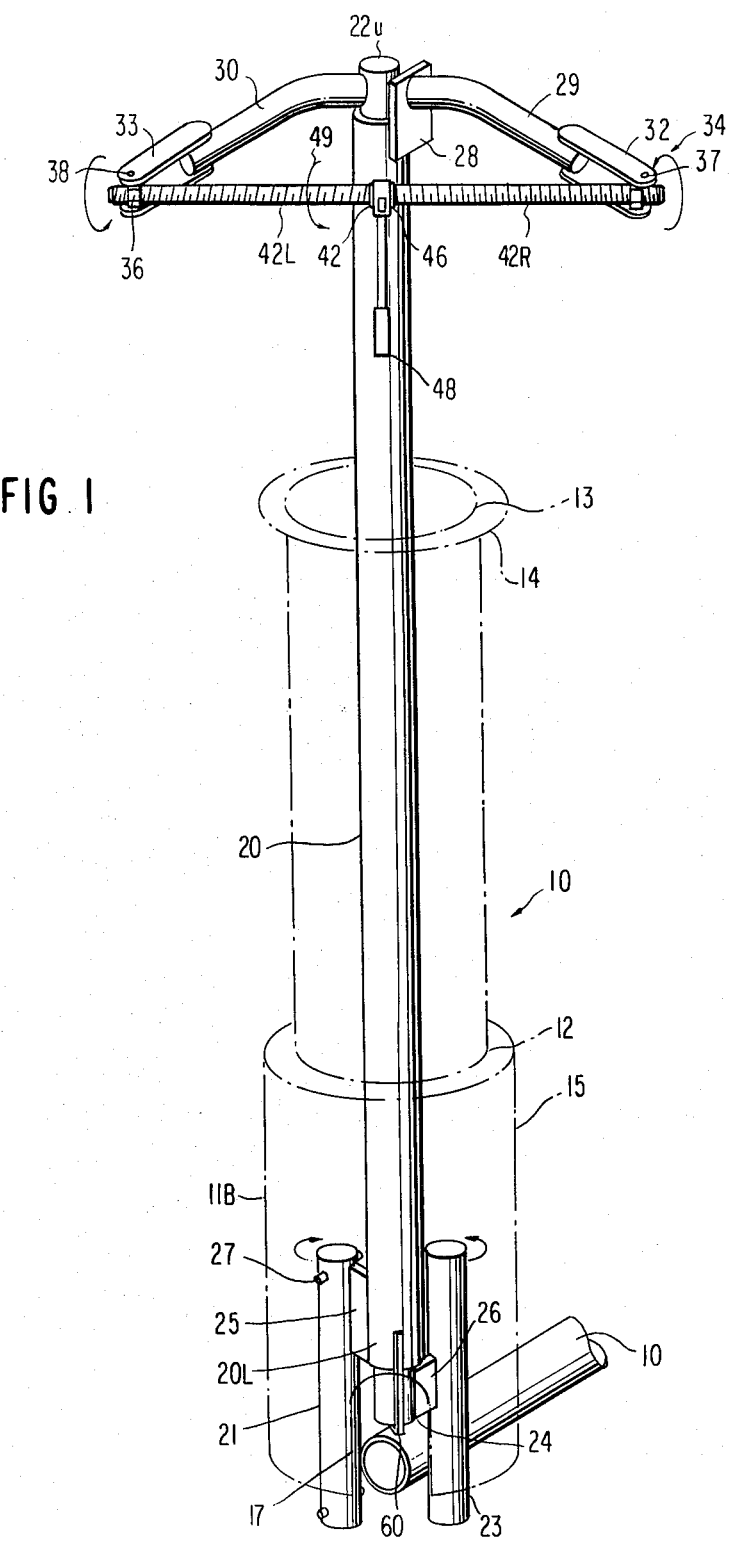
FIG. 1 is a partial isometric view of a gas distribution system incorporating the invention.
Figure 3:
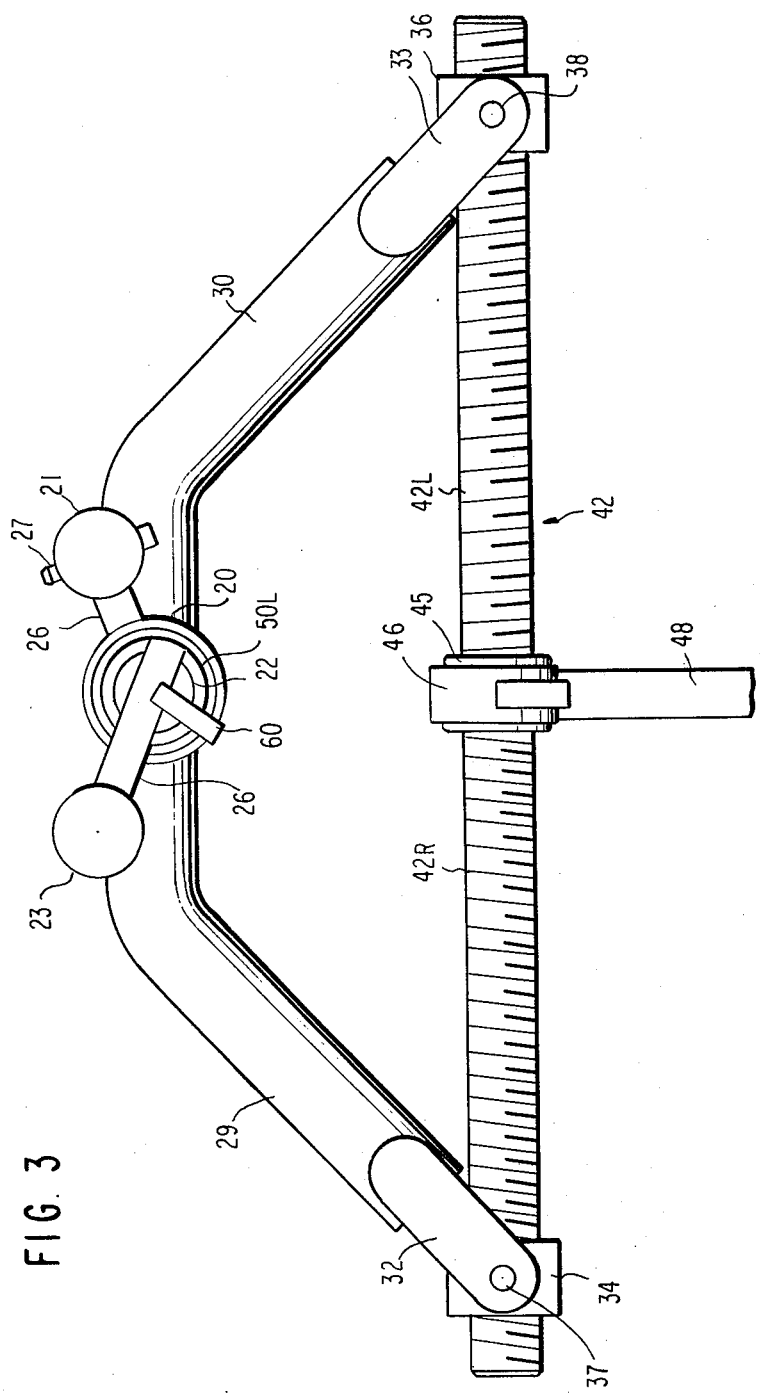
FIG. 3 is a bottom view of the plastic pipe squeeze device shown in FIGS. 1 and 2 and, FIG. 4 is a perspective view of a valve box incorporating the invention.

The lower section 11b is provided with a pair of aligned slots 17 and 18 which are aligned with and straddle the plastic pipe 10. It will be appreciated that the depth of the slots 17 and 18 are sufficient to permit the plastic pipe 10 to be several inches above the ground level and the base of lower member 11b. The intrusion of dirt and other foreign objects when the earth is replaced around the valve box section 11b is prevented by the lower annular section 11c.

Vertical drive pipe member 20 which, in a preferrred embodiment will have a diameter of 2 inches and an internal diameter somewhat less, has a first squeeze bar 21 secured to the lower end 20L by means of a bar 22 welded to the pipe end 20L and the upper end of squeeze bar 21. Mounted coaxially in pipe 20 is a second pipe 22, the lower end of which 22L is journaled for rotation via a set of bearings or bushings 50L and 50U at the upper and lower internal ends of pipe 20 (See FIG. 2) at the lower end 20L of pipe 20 and the upper end 20U of pipe 20 respectively. Squeeze bar 23 is secured to the projecting lower end 22L of pipe 22 by a coupling plate 26 welded to squeeze bar 23 and the lower end 22L of pipe 22. A threaded stop member 27 is in the upper end of squeeze pipe 21 (it could just as well be in the upper end of squeeze pipe 23 or there could be a stop member in both squeeze pipes). At any rate, the purpose of this stop member or element 23 is to limit the minimum distance between the two squeeze pipes 21 and 23 so as to prevent damage to plastic pipe 10.

The upper end 20U of external vertical pipe 20 has secured thereto (by welding) a short extension bar 28 which has welded at the upper edge thereof a lever arm 29. A similar lever arm 30 is secured to the upper end 22U of internal pipe 22. It will be noted that extension bar 28 permits lever arms 29 and 30 to be rotated about a common axis coaxial with the inner and outer pipes 20 and 22 and at essentially the same horizontal level. The outer extremities of each lever arm 29 and 30 is provided with clevis 32 and 33, respectively, each clevis having a threaded coupling member 34 and 36, respectively, pivotally mounted therein by pivots 37 and 38, respectively. A left/right threaded bar 42 is threadably received in each threaded nut 34, 36, respectively, the left handed end 42L of bar 42 having a left handed thread therein and the right handed end 42R having a right handed thread thereon. The central portion 45 of bar 42 is provided with a reversible ratcheting mechanism and a handle 48 is secured to the ratcheting mechanism 46. By operating the lever 48 and the ratcheting mechanism 46, to rotate bar 42 in direction indicated by the arrow 49 will rotate lever arms 29 and 30 towards each other in a oppositely rotating direction. And, the squeeze bars 21 and 23 secured to the lower ends of inner and outer vertical drive rods 20 and 22, respectively, squeezes the plastic pipe 10 to thereby provide a shut-off to the flow of gas in pipe 10.

A spacer 60 is provided at the lower end of pipe 22. This spacer is a short distance away from the actual point of engagement of squeeze bars 21 and 23 so that as the plastic pipe is squeezed and is compressed, the space above the point of squeeze is open so that the pipe wall surface is not damaged when forced upwardly as it is squeezed at the squeeze point. It is obvious that instead of a fixed or rigid spacer a resilient spacer could be utilized to perform the same function. While the squeeze tool of this invention is adopted for use with the valve box disclosed herein, it will be appreciated that it can be used in many other situations and is not limited to the specific use disclosed herein.

While I have shown and described a preferred embodiment of the invention, it will be appreciated that various obvious modifications and adaptations of same can be derived by those skilled in the art and still be within the spirit and scope of the invention.

What is claimed is:

1. A squeeze tool for hollow plastic pipe comprising,
   a hollow circular first shaft,
   a second shaft coaxial with said hollow circular first shaft and mounted for rotation within said first shaft,
   a pair of plastic pipe engaging members, the respective axes each of said plastic pipe engaging members being parallel to each other and the common axis of said coaxial shafts,
   means joining one of said pair of pipe engaging members to said first shaft,
   means joining the other of said pipe engaging members to said second shaft so that the axis of said pair of pipe engaging members are at equal radii from the common axis of said coaxial shafts,
   and drive means at the opposite ends, respectively, of said shafts for relatively rotating same so that one of said pipe engaging members rotate on an arc towards the other of said pipe engaging members to squeeze the interior walls of said hollow plastic pipe together.

2. The invention defined in claim 1 including means for preventing damage to said plastic pipe as it is being squeezed.

3. The invention defined in claim 1 including means for establishing the minimum distance between said pipe engaging members to prevent damage to said plastic pipe.

4. The invention defined in claim 1 including means spaced from the axis of said pipe engaging means to permit vertical distension of said plastic pipe as it is squeezed by said pipe engaging members.

5. The invention defined in claim 1 wherein said drive means includes crank member secured to each said first and second shafts and means for rotating said cranks to move said pipe engaging members toward each other to squeeze said plastic pipe and away from each other to release said plastic pipe.

6. The invention defined in claim 1 wherein said pipe engaging members depend below the lower ends of said first and second shafts.

7. The invention defined in claim 1 including a spacer member at the lower end of one of said shafts to provide an open space immediately above the point of engagement of said pipe engaging members with said plastic pipe.

8. In a squeeze tool for buried, underground, hollow plastic pipe carrying fluid substances, said tool having a pair of pipe engaging members for squeezing plastic pipe, the improvement wherein said pipe engaging members are vertically oriented with respect to horizontal runs of plastic pipe, and means for rotating said pipe engaging members about a vertical axis to engage and squeeze the opposing walls of said hollow pipe together to shut off the flow of fluid substances therein.

9. In a valve box for burial in the ground for permitting access to an underground plastic pipe by the squeeze tool defined in claim 1, the improvement comprising a pair of coaxial tubular members, one of said tubular members telescoping within the other of said tubular members, so as to permit the vertical height of said valve box to be adjusted to accomodate the earth surface, said tubular members being cylindrical and having internal diameters of no greater than 8 inches, respectively, the lower of said tubular members having a pair of aligned slots in the walls thereof through which said plastic pipe passes, the depth of said pair of aligned slots being sufficient to permit the plastic pipe to be spaced several inches above the level of ground in the bottom of said valve box.

10. A method of repairing a portion of a gas distribution main having a plurality of valve boxes as defined in claim 9 comprising squeezing said plastic pipe by a pair of said squeeze tools via a pair of said valve boxes between which is located said portion of a gas distribution main requiring repair.

* * * * *